United States Patent [19]

Yoshida et al.

[11] Patent Number: 4,499,512
[45] Date of Patent: Feb. 12, 1985

[54] REEL DRIVE SYSTEM OF MAGNETIC RECORDING AND REPRODUCING APPARATUS

[75] Inventors: Masashi Yoshida, Nakaminato; Noboru Katohno, Mito; Hajime Yokota, Katsuta; Masao Okayama, Ibaraki, all of Japan

[73] Assignee: Hitachi, Ltd., Tokyo, Japan

[21] Appl. No.: 438,766

[22] Filed: Nov. 3, 1982

[30] Foreign Application Priority Data

Nov. 6, 1981 [JP] Japan ................................ 56-177159
Nov. 20, 1981 [JP] Japan ................................ 56-185370

[51] Int. Cl.³ .......................... G11B 5/00; G11B 15/00
[52] U.S. Cl. .................................................... 360/90
[58] Field of Search .................... 360/85, 90, 91, 92, 360/93, 95, 96.1, 96.3; 242/54 R, 197, 201, 200, 206–210

[56] References Cited

U.S. PATENT DOCUMENTS

| | | | |
|---|---|---|---|
| 4,173,320 | 11/1979 | Schatteman | 242/206 |
| 4,279,006 | 7/1981 | Sasaki et al. | 360/90 |
| 4,395,743 | 7/1983 | Sunaga et al. | 360/90 |

Primary Examiner—Robert L. Richardson
Attorney, Agent, or Firm—Antonelli, Terry & Wands

[57] ABSTRACT

A magnetic recording and reproducing apparatus including a reel drive system having a first transmitting path for high-speed magnetic tape feed, and a second transmitting path for constant-speed magnetic tape feed. The first transmitting path includes a drive pulley for driving a pair of magnetic tape reels through oscillating idler means which is supported on a support shaft located on a bisector perpendicular to the center of the pair of magnetic tape reels to directly transmit the rotation of a reversible motor to the drive pulley. The second transmitting path transmits the rotation of the reversible motor through a slip mechanism to obtain a predetermined output torque. One of the two transmitting path is selected for each operation mode as switching of the operation modes is effected.

24 Claims, 15 Drawing Figures

F I G. 6
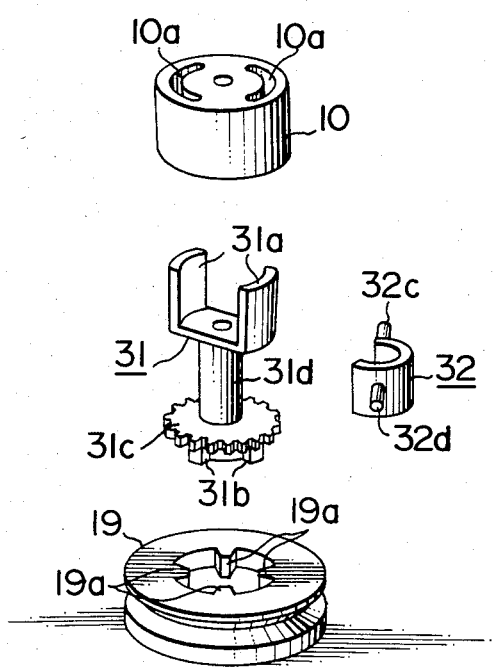

REEL DRIVE SYSTEM OF MAGNETIC RECORDING AND REPRODUCING APPARATUS

FIELD OF THE INVENTION

This invention relates to a reel drive system of a magnetic recording and reproducing apparatus or a video tape recorder (VTR for short) wherein a magnetic head is brought into contact with a magnetic tape moved past two reels for performing magnetic recording or reproducing of information.

DESCRIPTION OF THE PRIOR ART

Heretofore two systems have been available for driving the reels of a VTR. One system relies as a source of power on a motor for driving a capstan for feeding a tape at a predetermined speed, and the other system includes a motor exclusively for driving the reels. Meanwhile for driving the reels, it is necessary to supply at least two kinds of torques, one being a high torque for a fast feed (FF) mode and a rewind (REW) mode and the other being a low torque with a slip mechanism or a torque limiter suitable for use in reproducing the recorded information at constant speed. In the former drive system, it has hitherto been usual practice to provide a power transmission system for supplying a high torque to the reels and another power transmission system for supplying a low torque through a slip mechanism, and to use a mechanical switch for selecting the power transmission system suiting the mode.

A separate power source is necessary to effect power transmission system selection by remote control (or merely by means of switching between the two power transmission systems). To effect reproducing of recorded information at constant speed in two directions of forward and reverse requires the provision of separate slip mechanisms for the two reels. At the same time, four means for performing selection of the power transmission systems have been necessary for FF, REW, forward reproducing and reverse reproducing respectively. Thus the prior art system has suffered the disadvantage of being complex in construction and high in cost.

In the latter drive system, there are two processes, one process using two motors each for exclusively driving one of the two reels and the other process using only one motor capable of rotation in the normal and reverse directions for driving the reels through an oscillating idler. In these two processes, the torque is varied by controlling the voltage supplied to the motor. This latter drive system suffers the disadvantages that an additional motor of high performance with less torque ripples than in the former drive system is required and that the control circuit has to be provided, causing a rise in cost.

SUMMARY OF THE INVENTION (1) Object of the Invention

This invention has as its object the provision of a magnetic recording and reproducing system, simple in construction, having a drastically reduced number of component parts and easy to effect remote control of the transmission paths depending on the mode, or particularly a reel drive system suitable for use with such apparatus.

(2) Statement of the Invention

To accomplish the aforesaid object, there is provided according to the invention a reel drive system comprising a first motor capable of rotation in the normal and the reverse directions, a drive pulley rotatable about a support shaft located on a bisector substantially perpendicular to a pair of magnetic tape reels, oscillating idler means connected for rotation to the drive pulley for driving one of the pair of reels for rotation depending on the direction of its rotation, and transmission path selecting means for selecting, depending on the mode of operation, one of a first transmission path for directly transmitting the rotation of the first motor to the drive pulley and a second transmission path for transmitting the rotation of the first motor to the drive pulley thorugh a slip mechanism necessary to obtain a predetermined output torque.

According to the invention, mode switching means is further provided and actuated depending on the rotation of a second motor for loading and unloading a magnetic tape, such mode switching means being linked to the transmission path selecting means to obtain a reel drive force necessary to each operation mode by a simple construction.

In the invention, the first motor may be concurrently used as a capstan drive motor.

In the invention, when the magnetic tape is unloaded from a reproducing (recording) mode, the second transmission path is selected in the reel drive system.

BRIEF DESCRIPTION OF THE INVENTION

FIG. 6 is an exploded perspective view of the reel drive section shown in FIG. 3, showing the switch elements for the torque transmission path thereof;

DESCRIPTION OF THE PREFERRED EMBODIMENT

Construction of one embodiment of the invention will first be described in detail by referring to FIGS. 1–6. A reel drive section representing the essential portions of the invention will first be described.

Figure 1:
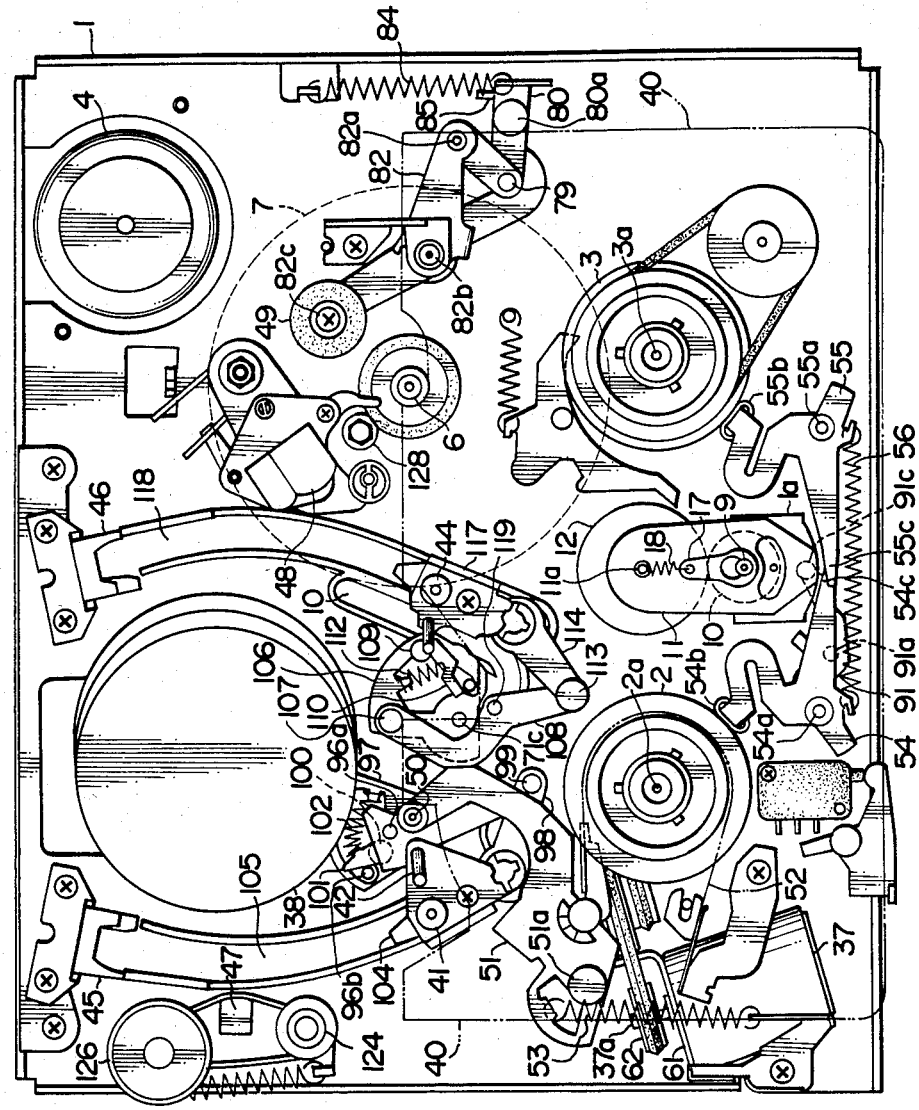
FIG. 1 is a plan view of a VTR in an inoperative condition in which the reel drive system according to this invention is incorporated.
Figure 2:
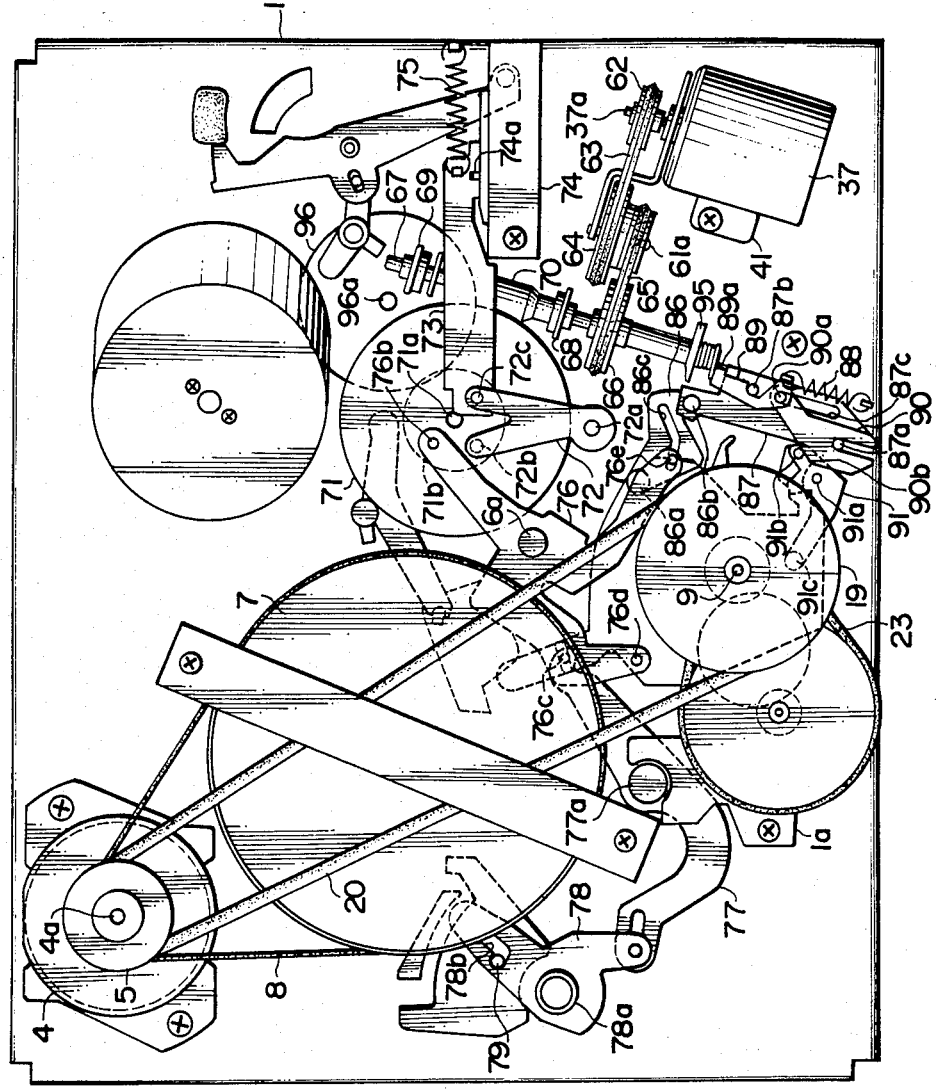
FIG. 2 is a bottom plan view of the VTR shown in FIG. 1.

In FIG. 1, a chassis 1 has reel decks 2 and 3 mounted thereon for rotation having reel shafts 2a and 3a secured thereto respectively. A reversible motor 4 mounted on the chassis 1 includes an output shaft 4a having, as shown in FIG. 2, a motor pulley 5 secured thereto. A capstan 6 is mounted on the chassis 1, and a belt 8 is trained over a fly wheel 7 mounted on the chassis 1 for rotation and the motor pulley 5.

Figure 3:
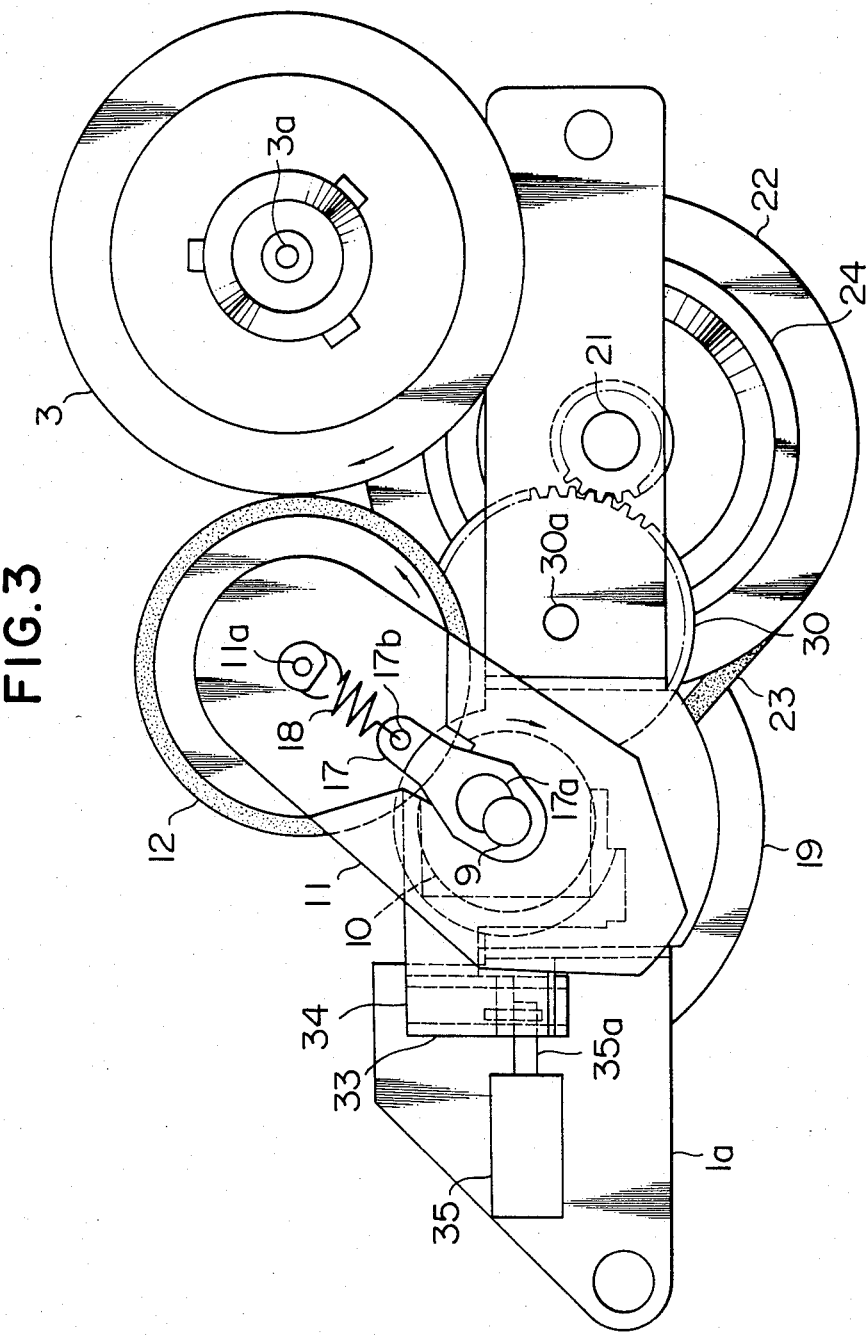
FIG. 3 is a plan view of one form of the reel drive section according to the invention.
Figure 4:
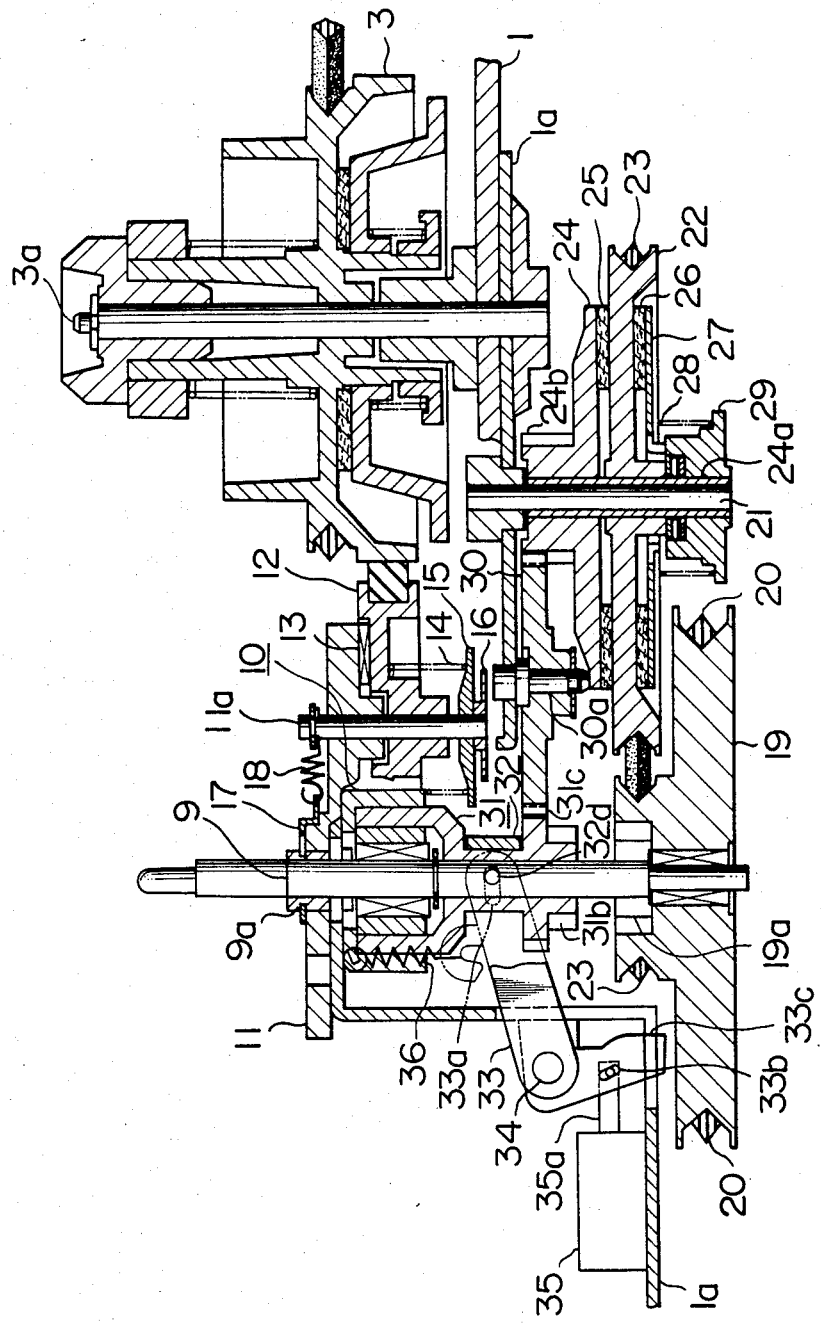
FIG. 4 is a sectional side view of the reel drive section shown in FIG. 3, showing such section in a mode other than FF/REW.

A shaft 9 is mounted on a subchasssis 1a secured to the chassis 1 on a vertical bisector of the line connecting together the reel shafts 2a and 3a at their centers. As shown in FIGS. 3 and 4, a drive pulley 10 is mounted on the shaft 9 for rotation, and an oscillating idler arm 11 is also mounted on the shaft 9 for rotation. The oscillating idler arm 11 has a shaft 11a attached thereto for rotatably supporting an idler 12. As shown in FIG. 4, the idler arm 11 and the idler 12 are coupled together in such a manner that a predetermined friction torque necessary for oscillation of the idler arm 11 is obtained by means of a felt 13, a spring 14, a spring seat 15 and a stopper 16. The idler arm 11, shaft 11a, idler 12, felt 13, spring 14, spring seat 15, stopper 16, a washer 17 and a spring 18 constitute oscillating idler means. The washer 17 has a slot 17a as shown in FIG. 3, and the spring 18 is mounted between the shaft 11a and an opening 17b at one end of the washer 17 to urge the idler 12 against the drive pulley 10 at all times. At the same time, the washer 17 serves as a stopper mounted in a groove 9a (see FIG. 4) formed in the shaft 9. The spring 18 has a biasing force large enough to transmit the rotational force of the drive pulley 10 to the reel decks 2a and 3a through the idler 12. The washer 17 rotates about the shaft 9 as the idler arm 11 moves in oscillating motion, so that the idler 12 is pressed against the drive pulley 10 in the same condition at all times.

Meanwhile, as shown in FIGS. 2 and 4, a belt pulley 19 is mounted at a lower portion of the shaft 9 for rotation. A belt 20 is trained over a major diameter portion of the belt pulley 19 and the motor pulley 5, and a belt 23 is mounted between a minor diameter portion thereof and a takeup pulley 22 rotatably pivoted at a hollow shaft portion 24a of a gear pulley 24 rotatably supported on a shaft 21. The gear pulley 24 and the takeup pulley 22 are coupled to each other by a coupling composed of washers 25 and 26, a pressing plate 27, a spring 28 and a stopper 29 so that a predetermined torque can be obtained. This coupling constitutes a slip mechanism.

Referring to FIG. 4, 31 designates a switching pulley rotatable about the shaft 9 and capable of vertical movement therealong. As shown in detail in FIG. 6 the switching pulley 31 comprises an arm 31a normally engaged in an opening 10a formed at the drive pulley 10, an engaging tooth section 31b and a gear section 31c. The engaging tooth section 31b is in engagement with inner peripheral ribs 19a formed in the belt pulley 19 for rotational connection. The gear section 31c is in meshing engagement with an idler gear 30 rotatably mounted on a shaft 30a attached to the subchassis 1a, the idler gear 30 normally meshing with a gear section 24a formed at the gear pulley 24. As shown in FIG. 4, when the switching pulley 31 is located at a height at which the gear section 31c meshes with the idler gear 30, the engaging tooth section 31b is brought out of engagement with the inner peripheral ribs 19a of the belt pulley 19. Conversely, as shown in FIG. 5, when the switching pulley 31 is located at a hight at which the engaging tooth section 31b is in engagement with the inner peripheral ribs 19a, the gear section 31c is brought out of engagement with the idler gear 30.

Referring to FIG. 6 again, a cylindrical portion 31d of a relatively small diameter is formed between the arm 31a of the switching pulley 31 and the gear section 31c thereof and a C-shaped ring 32 formed of a resilient material, such as a synthetic resinous material, is fitted over the cylindrical portion 31d. The C-shaped ring 32 has an inner diameter and an axial height such that there are clearances between them and the outer diameter and the axial height of the cylindrical portion 31d respectively. The C-shaped ring 32 is formed with projections 32c and 32d received in a slot 33a formed at one end portion of a switching arm 33 in the form of a letter L as shown in FIGS. 4 and 5. A spring 36 is mounted between an end portion of the switching arm 33 formed with the slot 33a and the subchassis 1a so as to bring the gear section 31c into meshing engagement with the idler gear 30. The switching arm 33 is mounted for pivotal movement at its corner on a pin 34 attached to the subchassis 1a, and a slot 33b formed at the other end portion of the switching arm 33 is connected to a plunger 35a of a solenoid 35. When the solenoid 35 is not energized, the switching arm 33 has its position regulated by a spring 36 and a subchassis 33c as shown in FIG. 4. At this time, the gear section 31c of the switching pulley 31 meshes with the idler gear 30. When the solenoid 30 is energized, the switching arm 33 is rotated clockwise against the biasing force of the spring 36 into a position shown in FIG. 5 in which the engaging tooth section 31b of the switching pulley 31 is in engagement with the inner peripheral ribs 19a of the belt pulley 19. Stated differently, the switching pulley 31, switching arm 33, spring 36, solenoid 35 and plunger 35a constitute transmitting path switching means.

Figure 5:
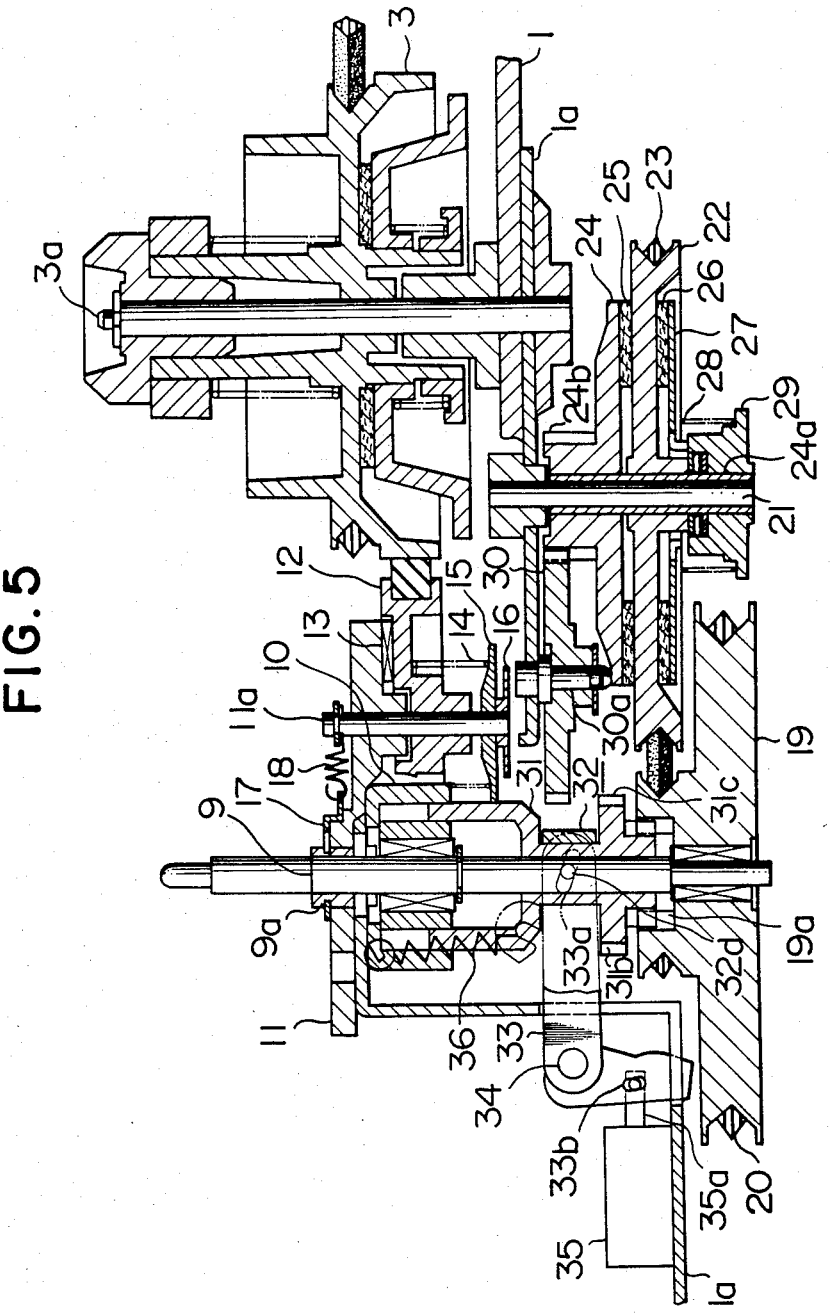
FIG. 5 is another side sectional view of the reel drive section shown in FIG. 3, showing such section in a mode other than the FF/REW.

Another example of the transmitting path switching means shown in FIGS. 3, 4 and 5 is subsequently to be described in detail.

Parts other than the reel drive section described by referring to FIGS. 1 and 2 will be outlined. 37 is a reversible loading motor. When the loading motor 37 rotates in one direction, tape guides 41, 42, 43 and 44 are actuated by a linkage driven by an output torque taken out from the motor 37 via a speed reducing mechanism subsequently to be described in detail. 45 and 46 are stoppers for positioning the tape guides 41–44. When the tape guides 41–44 move to this position, a tape, not shown, in a tape cassette 40 is wound a predetermined amount on a head cylinder 38 and at the same time brought into contact with stationary heads 47 and 48 to provide a predetermined travel path. A pinch roller 49 pressing the tape against the capstan 6 is actuated by a linkage subsequently to be described in detail for pressing the pinch roller 49 driven for operation from the loading motor 37 as is the case with the tape guides 41–44, so as to press the tape against the capstan 6.

A pin 50 is attached to a tension arm 51 pivotally supported by a shaft 51a on the chassis 1. After loading the tape, the tension arm 51 is pivotally moved counterclockwise in FIG. 7 by a known tension servo mechanism relying on a handbrake 52 and a spring 53, to bring the pin 50 into contact with the tape. Brake arms 54 and 55 are mounted on shafts 54a and 55a respectively on the chassis 1 for rotation, and a spring 56 is mounted between them to apply the brake to the reel decks 2 and 3. When the tape is driven in reproducing, FF and REW modes, brake releasing means, not shown, is actuated to move the brake arms 54 and 55 clockwise and counterclockwise respectively in FIG. 1, to release the brake.

The mechanisms referred to hereinabove will now be described in detail. Referring to FIGS. 1 and 2 again, the mode switching motor 37 is mounted on the chassis 1 through a bracket 61 and has an output shaft 37a secured to a motor pulley 62. A belt 63 is trained over the motor pulley 62 and a major diameter portion of a pulley 64 rotatable about a shaft 61a on the bracket 61. A shaft 67 is journalled on bearings 68 and 69 secured to a base plate and has a pulley 66 and a worm 70 secured thereto. A belt 65 is trained over the pulley 66 and a minor diameter portion of the pulley 64 to transmit rotation of the mode switching motor 37 to the worm 70. 71 is a cam gear rotatable about a shaft 71a on the chassis 1 and formed at its outer periphery with a screw gear meshing with the worm 70 and driven for rotation thereby. In a plan view, the screw gear is formed with a plurality of cam grooves A and B, not shown. A pin 72b attached to a lever 72 pivotable about a shaft 72a on the chassis 1 is in engagement in the cam groove A. Another pin 72c attached to the lever 72 is loosely linked to a slidable mode slider 73 which in turn is connected to a knob 74a of the mode switch 74 having a plurality of built-in contacts which at least controls the condition in which a current is passed to the mode switching motor 37. The shape of the cam groove A is such that it is possible to positively obtain a predetermined amount of rotation of the mode switching motor 37 or the cam groove 71 for each operation mode in accordance with the positions of the contacts of the switch 37 set beforehand.

A pin 76b attached to a mode switching lever 76 pivotable about a shaft 76a on the chassis 1 is in engagement in the cam groove B. The shape of the cam groove B is such that the mode switching lever 76 can be moved to a predetermined position for each operation mode by means of the cam gear 71 adapted to impart a predetermined amount of rotation to each operation mode.

Another pin 76e on the mode switching lever 76 is in engagement in a cam groove 86c on a lever 86 pivotable about a shaft 86a on the chassis 1, and a pin 86b on the lever 86 is loosely connected to a slider 87 slidably guided by a pin 87a on the chassis 1. The slider 87 has a pin 87b attached thereto and has a slot 87c formed therein. 90 is a brake operating slider having a pin 90a attached thereto which is received in the slot 87c of the slider 87 and guided thereby and which at the same time is guided by the pin 87a for sliding movement. A lock arm 89 is mounted for rotation about a pin 90a, and a spring 88 is mounted between the lock arm 89 and the chassis 1, so that the lock arm 89 and the brake operating slider 90 are normally biased as a unit by the spring 88 and positioned by the pin 87b. A pin 91b attached to a return arm 91 rotatable about a shaft 91a on the chassis 1 extends into contact with a slope 90b of the brake operating slider 90.

Meanwhile the mode switching lever 76 is formed with a slot 76c for driving the pinch roller 49 which is connected to levers 77 and 78 pivotable about shafts 77a and 78a on the chassis 1. The lever 78 is formed with a groove 78b capable of driving a pin 79. Referring to FIG. 1 again, the pin 79 connects for rotation an arm 80 rotatable about a shaft 80a on the chassis 1 to a link 81 rotatably connected to a pin 82a on a pinch roller arm 82 rotatable about a shaft 82b on the chassis 1. A spring 84 is mounted between the arm 80 and the chassis 1. The numeral 85 is a stopper for the arm 80 on the chassis 1, and the pinch roller arm 82 has attached thereto a shaft 82c for supporting the pinch roller 49 for rotation.

FIG. 2 shows the mode switching lever 76 as having still another pin 76d. This pin 76d has nothing to do with the embodiment of the invention shown and described herein, so that the description thereof shall be omitted. The brake arms 54 and 55 are mounted for rotation about the shafts 54a and 55a respectively and provided with brake shoes 54b and 55b adapted to come into contact with outer peripheries of the reel decks 2 and 3, and arm portions 54c and 55c adapted to come into contact with a boss 91c of the return arm 91. The spring 56 is mounted between the brake arms 54 and 55 to urge same to rotate counterclockwise and clockwise respectively.

Meanwhile a latch pulley 95 constituting a one-way clutch relying on a coil spring is mounted on the shaft 67 shown in FIG. 2 and includes a pawl portion adapted to come into contact with a bent portion 89a of the lock arm 89 when the latter moves from the position shown in FIG. 2 in a direction opposite the direction in which the biasing force of the spring 89 acts. When the shaft 67 rotates in a direction in which the FF/REW mode is switched to the stop mode, rotation of the shaft 67 is transmitted to the latch pulley 95; when the shaft 67 rotates in a direction in which the stop mode is switched to the FF/REW mode, rotation of the shaft 67 is kept from being transmitted due to a slip.

Figure 7:
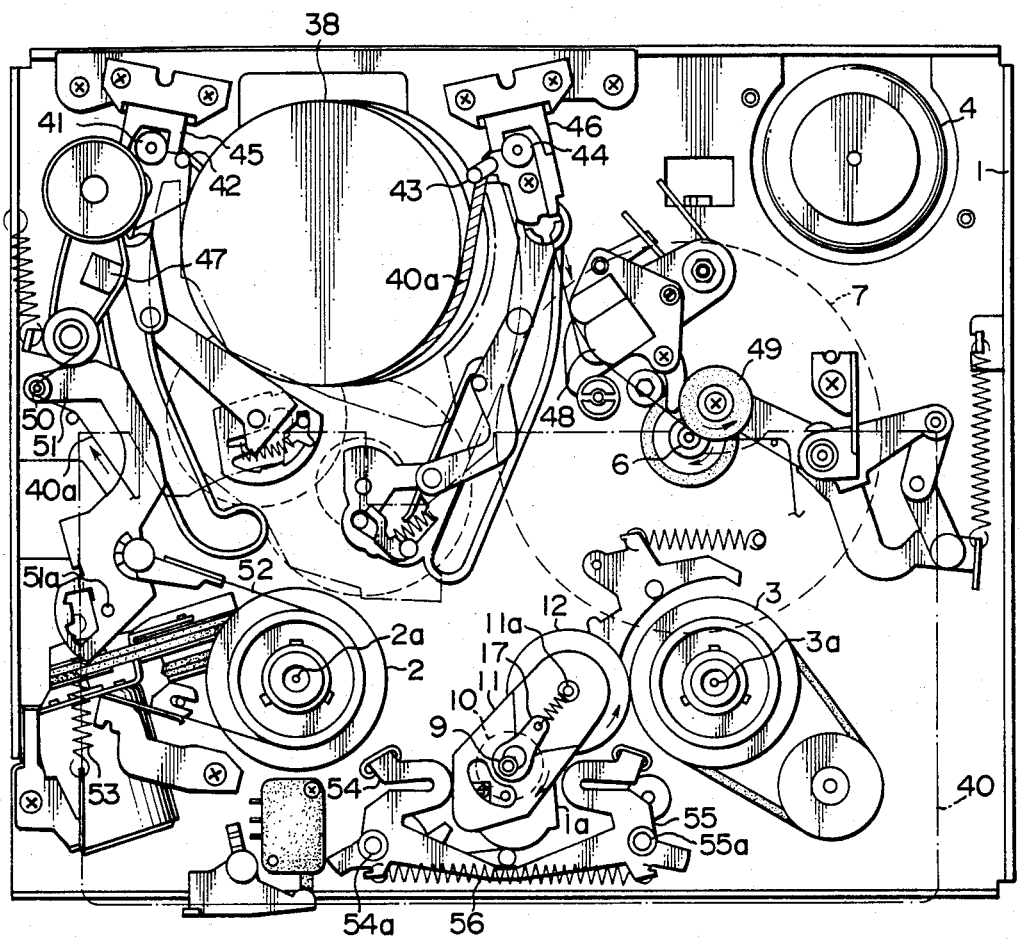
FIG. 7 is a plan view of the VTR shown in FIG. 1, shown in a forward recording (reproducing) condition.

Operation of the one embodiment of the invention shown in FIGS. 1–6 will be described by referring to FIGS. 7–10. The operation will first be outlined. Upon an operation button, not shown, being depressed for reproducing (recording) when the apparatus is in the stop mode, the brake arms 54 and 55 are pivotally moved clockwise and counterclockwise respectively by the brake releasing means, so that the brake applied to the reel decks 2 and 3 is removed. The loading motor 37 is driven and a tape in the tape cassette 40 is withdrawn therefrom by the tape guides 41, 42 and 43 and 44. The tape is wound around the rotary head cylinder 38 for a predetermined circumferential extent thereof as shown in FIG. 4 and a predetermined path as shown in FIG. 7 is formed. At this time, the motor 4 is driven to rotate clockwise in FIGS. 1 and 7 and counterclockwise in FIG. 2, to thereby drive the flywheel 7 by the belt 8 and the belt pulley 19 by the belt 20 for rotation counterclockwise in FIG. 2. As the tape guides 41–44 reach the stoppers 45 and 46 and loading of the apparatus with the tape is finished, the pinch roller 49 presses the tape 40a against the capstan 6, so that the tape 40a travels in the direction of an arrow because the capstan 6 is rotating clockwise in FIG. 7. The motor 37 becomes inoperative because a limit switch, not shown, is actuated following the engagement of the pinch roller 49 with the capstan 6 as aforesaid.

Figure 8:
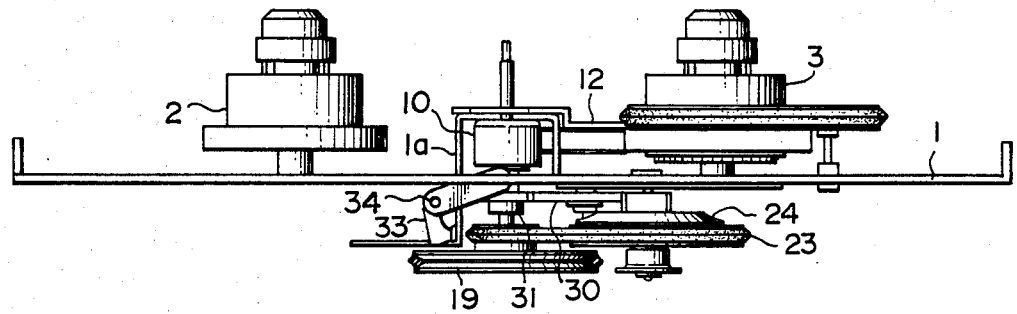
FIG. 8 is a fragmentary side view of the VTR shown in FIG. 7.

Meanwhile, in FIG. 4, rotation of the belt pulley 19 is transmitted to the takeup pulley 22 through the belt 23 and to the gear pulley 24 by the coupling constituted by the felt washers 25 and 26, pressing plate 27, spring 28 and stopper 29. The rotation is then transmitted to the switching pulley 31 through the idler gear 30 meshing with the gear section 24b. Thus in FIG. 4, the switching pulley 31 and the drive pulley 10 in engagement with the switching pulley 31 at all times in the same direction of rotation are driven for rotation clockwise, so that the oscillating idler arm 11 is driven for movement in the counterclockwise direction by a friction torque of the felt washer 13 and spring 14. As the idler 12 is positioned against the outer periphery of the reel deck 3, the idler 12 drives the reel deck 3 clockwise. At this time, the torque supplied to the reel deck 3 is set at a necessary value beforehand and the tape 40a fed by the capstan 6 and pinch roller 49 at a constant speed is wound by the takeup pulley 22 and felt washers 25 and 26 while slipping at all times. Reproducing or recording is carried out in this way as the tape is driven at a constant speed in the forward direction. FIG. 8 is a fragmentary side view of the condition of the parts shown in FIG. 7. At this time, a suitable back tension is applied to the reel deck 2 by a tension servo mechanism comprising the tension arm 51 and other parts as shown in FIG. 7.

Figure 9:
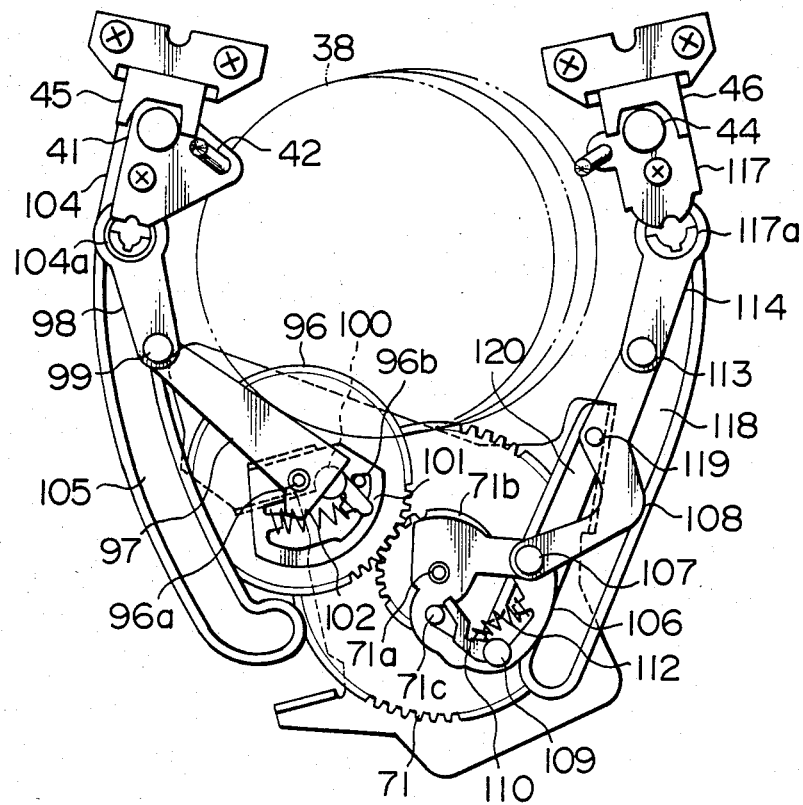
FIG. 9 is a plan view, on an enlarged scale, of the loading mechanism shown in FIG. 7.
Figure 10:
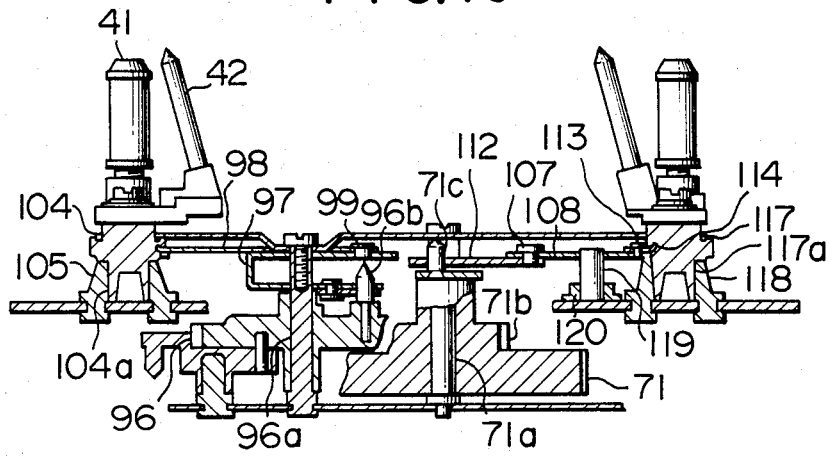
FIG. 10 is a side view of the loading mechanism shown in FIG. 9.

FIG. 9 is a plan view, on an enlarged scale, of the loading/unloading mechanism, and FIG. 10 is a fragmentary sectional view of this mechanism. The cam gear 71 is formed with a serration at the outer periphery of its minor diameter portion 71b which meshes with a gear 96 rotatable about a shaft 96a on the chassis 1. The shaft 96a has a drive arm 97 mounted thereon for rotation which is connected by a pin 99 to an arm 98 for pivotal movement. A spring pressor arm 101 is connected by a pin 100 to the drive arm 97. A pressor spring 102 is held between the spring pressor arm 101 and the drive arm 99, and the spring pressor arm 101 is capable of being positioned against a pin 96b attached to the gear 96. Meanwhile the arm 98 is connected for rotation to a boss 104a of a guide member 104 which supports thereon the tape guides 41 and 42 for withdrawing the tape 40a and guiding same along a predetermined path and moves in sliding movement along a guide groove 105 formed in the chassis 1. Likewise, the shaft 71a has connected thereto for rotation a drive arm 106 which is connected by a pin 107 to an arm 108 for pivotal movement and by a pin 109 to a spring pressor arm 110. A pressor pin 112 is held between the spring pressor arm 110 and the drive arm 106, and the spring pressor arm 110 is capable of being positioned against a pin 71c attached to the cam gear 71. Meanwhile the arm 108 is connected by a pin 113 to an arm 114 for pivotal movement which is connected to a boss 117a of a guide member 117 which supports the tape guides 43 and 44 for withdrawing the tape 40a and guiding same along the predetermined path and moves in sliding movement along a guide groove 118 formed in the chassis 1. The arm 108 has a pin 119 attached thereto and guided by a guide groove 120 formed in the chassis 1.

In FIG. 1, the guide members 104 and 117 withdraw the tape 40a from the tape cassette 40 by means of the tape guides 41, 42, 43 and 44 placed thereon in the recoding and reproducing modes and threads the tape through a predetermined path along a fixed tape guide 124, the erazeer head 47, an impedance roller 126, a rotary head cylinder 38, the audio control head 48 and a fixed guide 128. At this time, the guide members 104 and 117 are positioned by the stoppers 45 and 46 secured on the chassis 1.

Movement of the tape 40a at a constant speed in the reverse direction by means of the capstan 6 will now be described. Operation of the reel drive system from the stop mode to the tape loading and pressing of the pinch roller against the capstan shown in FIGS. 7-10 is performed in the same manner as described hereinabove, except that the direction of rotation of the motor 4 is reversed which is clockwise in FIG. 2. Thus the flywheel 7 and belt pulley 19 are rotated by the belts 18 and 20 respectively clockwise in FIG. 2. Meanwhile the drive pulley 10 rotates counterclockwise in FIG. 1 because rotation of the belt pulley 19 is transmitted through the belt 23, takeup pulley 22, gear pulley 24, idle gear 30 and switching gear 31. This causes the idler arm 11 to move counterclockwise in pivotal movement to drive the reel deck 2 counterclockwise. Thus the tape 40a is moved by the capstan 6 and pinch roller 49 in the reverse direction to be wound on the reel deck 2 to perform reproducing (recording) in the reverse direction.

In performing the operation of stopping the reel drive system from the aforesaid reproducing (recording) mode, the loading motor 37 is first rotated in a direction opposite the direction of rotation for performing tape loading. The pinch roller 49 is released from engagement with the capstan 6, and the tape guides 41-44 are moved rearwardly. At this time, the motor 4 is driven for rotation in the reverse direction almost simultaneously as the aforesaid operations in FIG. 2, so that the reel deck 2 is driven through the slip mechanism in the same manner as in the reproducing (recording) in the reverse direction. Thus the tape 40a loosened by the rearward movement of the tape guides 41-44 is all would in the tape cassette 40, and the limit switch is actuated when the tape guides 41-44 are restored to the positions in the tape cassette 40 to deactuate the loading motor 37 and motor 4. At this time, the brake releasing means, not shown, in restored to the original position and the brake is applied to the reel decks 2 and 3 by the brake arms 54 and 55 and the spring 56, to bring the apparatus to the stop mode.

The FF/REW mode will now be described. Upon an FF mode operating button, not shown, being depressed, the brake releasing means, not shown, is actuated to release the brake applied to the reel decks 2 and 3 by the brake arms 54 and 55. At the same time, the motor 4 is actuated to rotate counterclockwise in FIG. 2 and the solenoid 35 is energized in FIG. 3, so that the switching arm 33 is moved in pivotal movement clockwise about the pin 34 against the biasing force of the spring 36 in FIG. 5. At this time, the belt pulley 19 rotates counterclockwise in FIG. 2, and the gear 31c of the switching pulley 31 is released from meshing engagement with the idle gear 30 to bring the engaging tooth section 31b into engagement with the inner peripheral ribs 19a of the belt pulley 19. Thus rotation of the motor 4 is transmitted through the belt 20, belt pulley 19 and switching pulley 19 to the drive pulley 10 to rotate same clockwise in FIG. 3. This enables the reel deck 3 to be rotated at high speed through the idler 12. That is, the reel deck 3 is driven for rotation by having a predetermined torque transmitted thereto directly, not through the agency of a slip mechanism. When the apparatus is brought to the stop mode from this mode, the motor 4 stops rotating and the brake releasing means is restored to the original position, so that the brake applied to the reel decks 2 and 3 is released and the tape 40a stops movement. At this time, the solenoid 35 is deenergized and the switching arm 33 is returned to the original position by the biasing force of the spring 36 as shown in FIG. 4.

Upon an REW mode operating button, not shown, being depressed when the tape drive system is in the condition shown in FIG. 1, the brake applied to the reel decks 2 and 3 is released in the same manner as described by referring to depressing of the FF mode operating button, and the solenoid 35 is energized to allow the tape 40a to move through the path shown in FIG. 5. However, the motor 2 is rotated clockwise in FIG. 2, so that the drive pulley 10 rotates counterclockwise in FIG. 1 to allow the idler 12 to operate the reel deck 2 at high speed. When the system is switched to the stop mode from this mode, the motor 4 stops rotation and the tape 40a stops its travel as the brake is applied to the reel decks 2 and 3, so that the reel drive system is restored to the condition shown in FIG. 4.

The first embodiment of the invention has been shown and described hereinabove. A second embodiment will now be described in detail by referring to FIGS. 11-14. The second embodiment is distinct from the first embodiment in that whereas the latter uses the solenoid 35 for driving the mode switching arm 33, a pin 76d on the mode switching lever 76 as shown in FIG. 2 is used in the former for the same purpose. In the second embodiment, the solenoid 35 can be eliminated for switching the modes and the cost can be further reduced.

Figure 11:
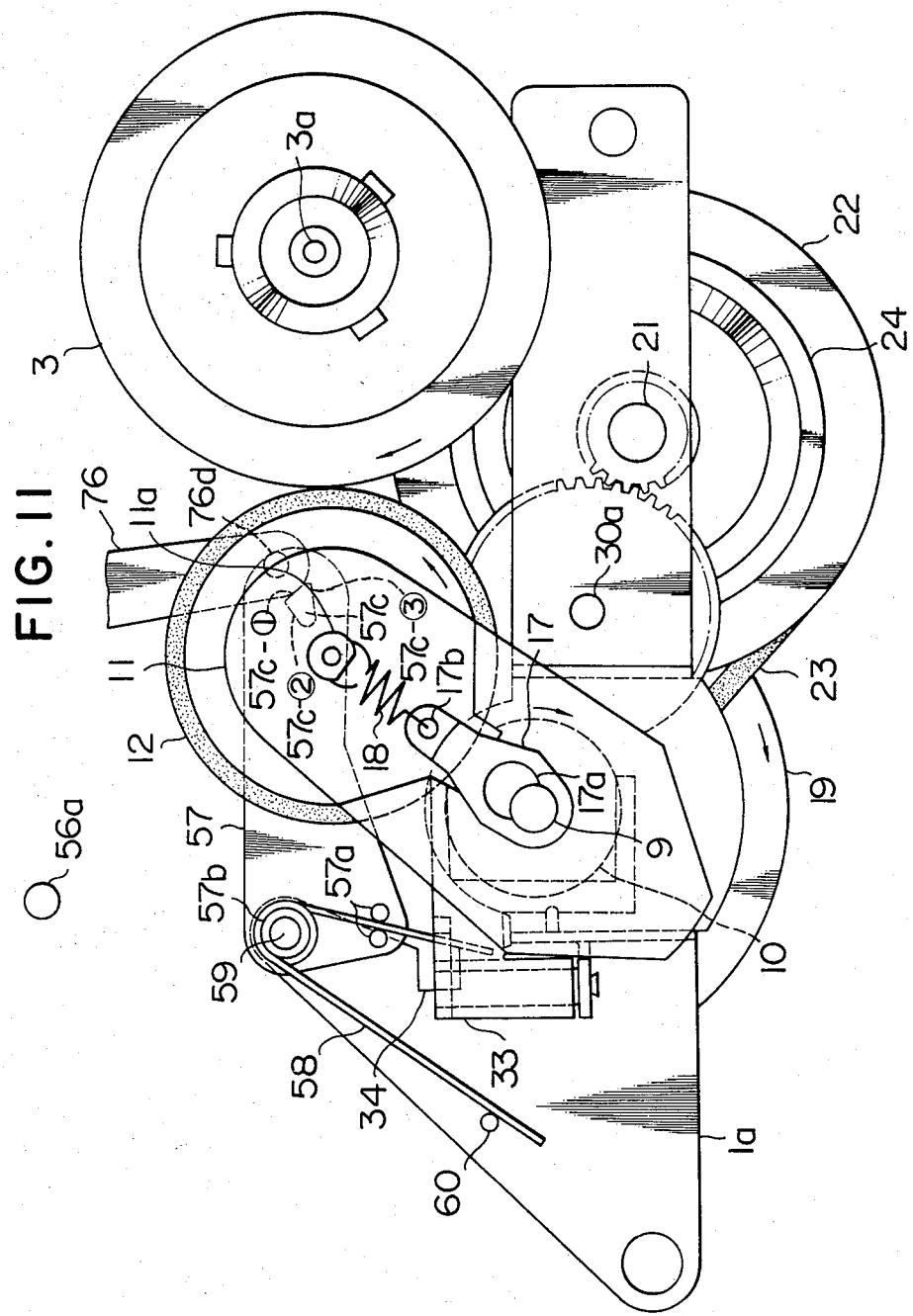
FIG. 11 is a plan view of another form of reel drive section according to the invention, shown in a forward recording (reproducing) condition.
Figure 12:
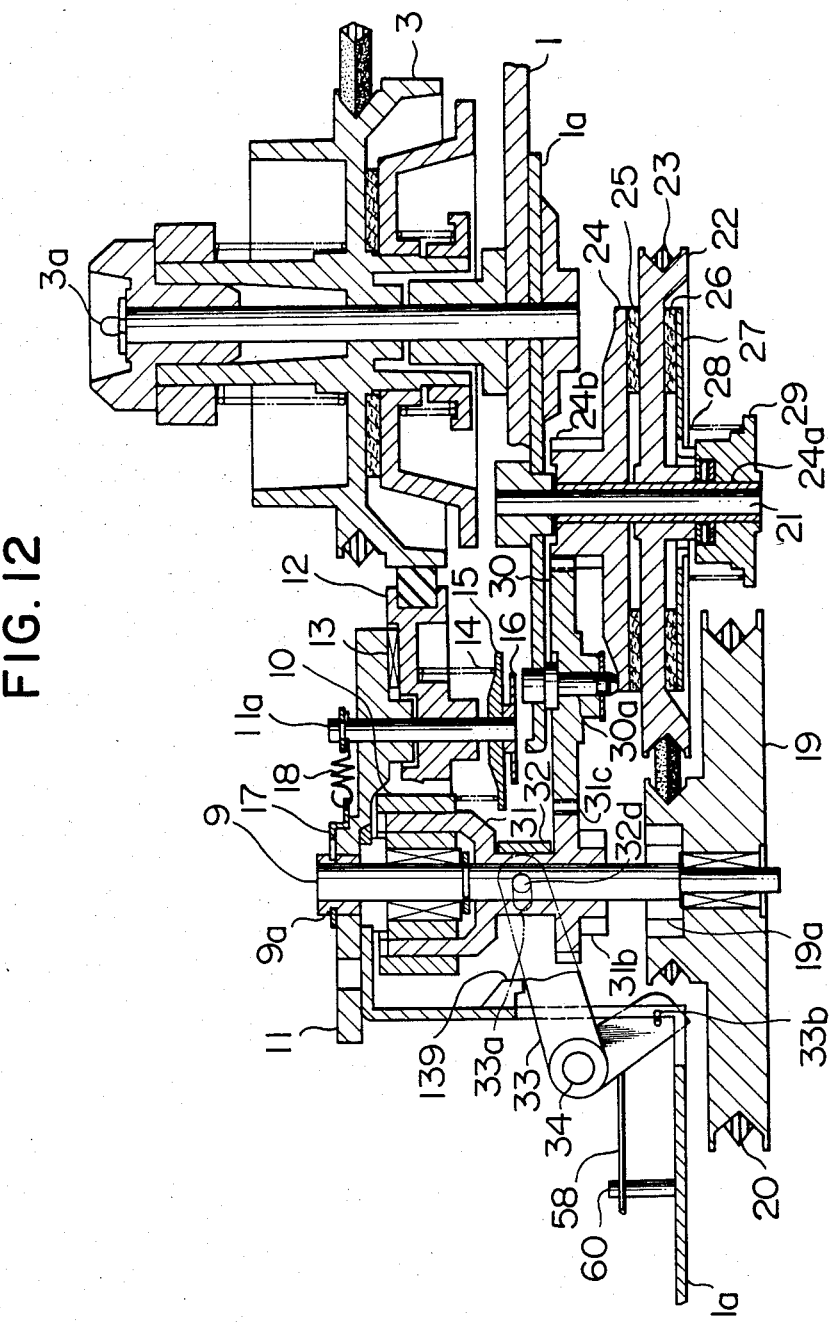
FIG. 12 is a side view of the reel drive section shown in FIG. 11, shown in a mode other than FF/REW.
Figure 13:
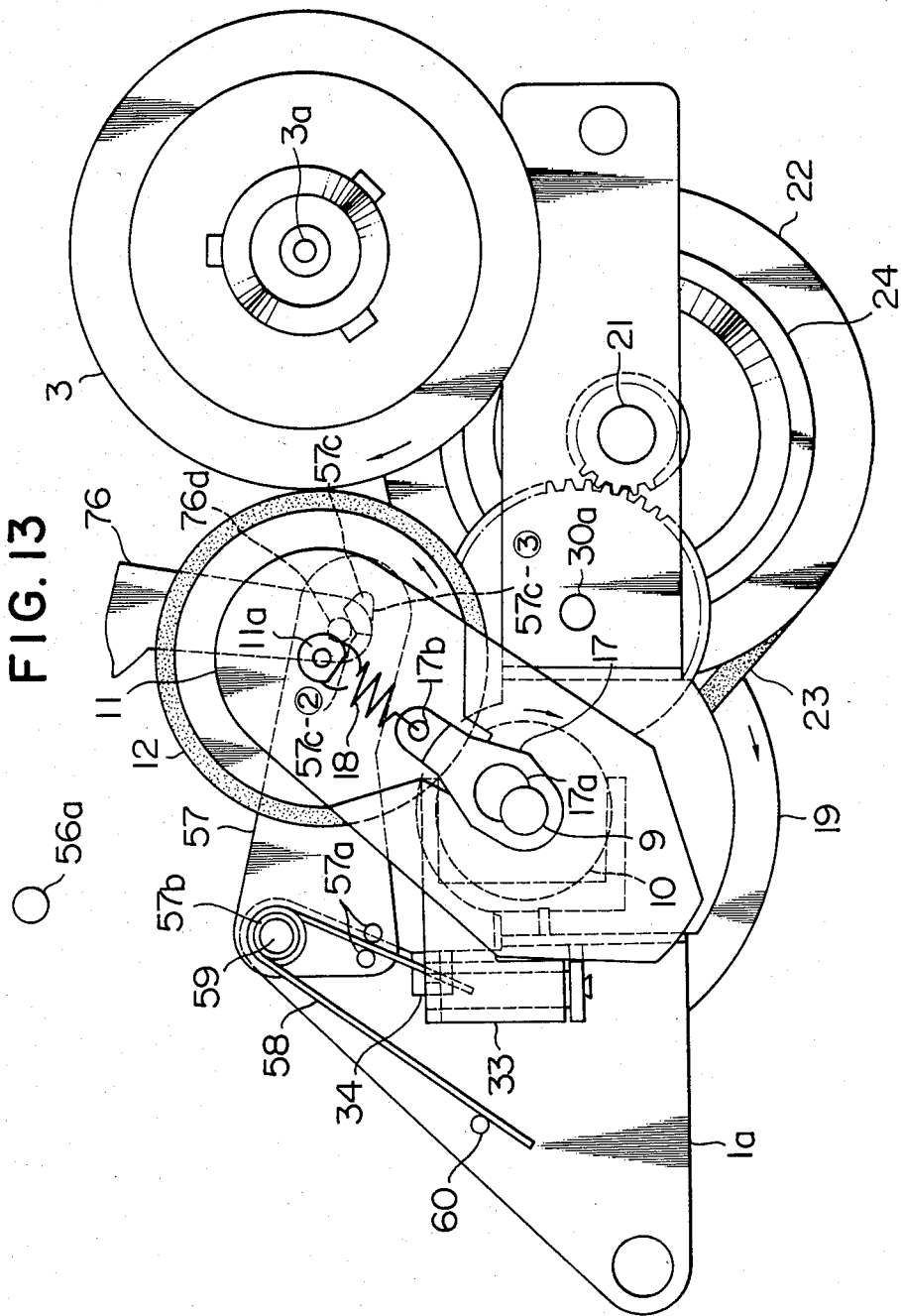
FIG. 13 is a plan view of the reel drive section shown in FIG. 11, shown in an FF mode.

In the embodiment, a pin 59 is attached to the subchassis 1a as shown in FIGS. 11 and 13 for supporting a cam arm 57 for pivotal movement about the pin 59. A coil portion of a spring 58 is fitted over a bearing boss portion 57b of the cam arm 57 and one arm of the spring 58 is mounted on a stopper pin 60 on the subchassis 1 and the other arm thereof extends through an opening 33b formed in the switching arm 33. Thus in FIGS. 11 and 12, the switching arm 33 is capable of moving in pivotal movement about the pin 34 counterclockwise and positioned by a stopper 139 mounted on the subchassis 1a. Meanwhile one arm of the spring 38 is held between ribs 57a of the cam arm 57 to enable the posture of the cam arm 57 to be decided simultaneously as the switching arm 33 is positioned.

The pin 65d on the mode switching lever 76 moves counterclockwise about a shaft 76a in FIG. 2 as the cam gear 71 rotates. However, in FIGS. 11 and 13, the pin 76a is shown in relation to the cam arm 57 described hereinabove. In the figures, the pin 76d rotates clockwise and moves near to a concave cam portion 57c formed on the cam arm 57. The concave cam portion 57a and the pin 76d have heights such that they can be positioned against each other.

Operation of the second embodiment of the construction described hereinabove will be described. Upon the FF (REW) mode operating button, not shown, being depressed when the system is in the condition shown in FIG. 1, the mode switching motor 37 rotates counterclockwise as viewed from the pulley 62 side in FIG. 2, so that rotation of the pulley 62 is transmitted by the pulley 66 through the belt 63, pulley 64 and belt 65. Thus the shaft 67 secured to the pulley 66 in a unitary structure rotates about the bearings 68 and 69 together with the worm 70 to drive the cam gear 71 for rotation about the shaft 71a clockwise in FIG. 2. At this time, the lever 72 and mode switching lever 76 move in pivotal movement in a counterclockwise direction as the pins 72b and 76b of these levers are engaged in the cam grooves A and B, not shown, of the cam gear 71, to allow the slider 87 to be moved by the pin 86b substantially upwardly in sliding movement. This allows the pin 87b to move the lock arm 89 and the brake slider 90 together with the slider 87 as a unit while the spring 88 is being stretched. This brings the inclined surface 90b of the brake slider 90 into abutting engagement with the pin 91b of the return arm 91 to impart to the arm 91 a rotary force oriented counterclockwise in FIG. 2 and clockwise in FIG. 1. As a result, a portion 91c of the arm 91 is brought into abutting engagement with arms 54c and 55c of the brake arms 54 and 55 to thereby cause the arms to pivot clockwise and counterclockwise respectively. This brings the brake shoes 54b and 55b of the brake arms 54 and 55 out of contact with the reel decks 2 and 3 respectively, so that the brake applied by the biasing force of the spring 56 is released.

Figure 14:
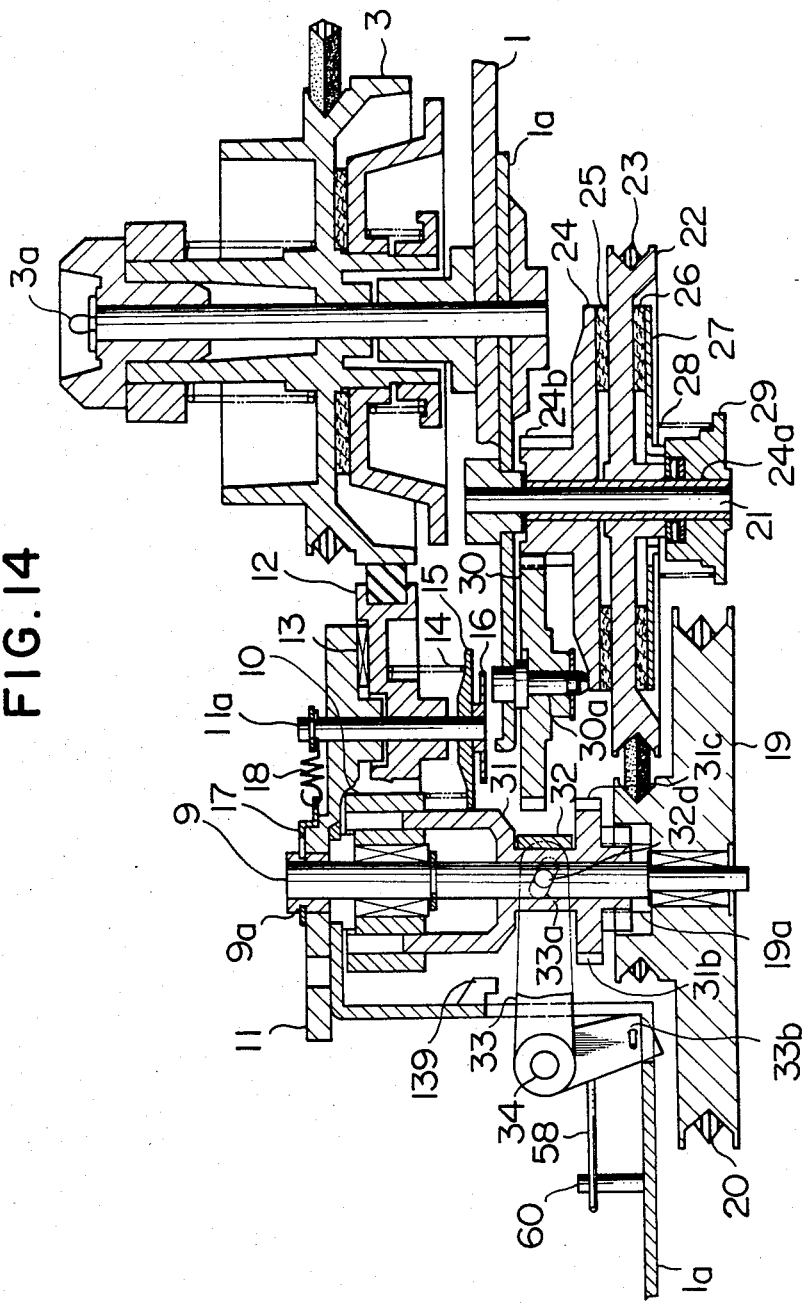
FIG. 14 is a side view of the reel drive section shown in FIG. 13.

Meanwhile the pin 76d on the mode switching lever 76 rotates counterclockwise in FIG. 2 and clockwise in FIG. 11 into abutting engagement with a cam section 75c-① of the cam arm 57, to cause the cam arm 57 to pivotally move clockwise into the condition shown in FIG. 13. In the FF mode, the motor 4 is driven to rotate counterclockwise in FIG. 2; and in the REW mode, it is driven to rotate clockwise therein. Thus the belt pulley 19 transmits rotation through the belt 20 to where it is needed. FIG. 13 shows the FF mode in which the belt pulley 18 is driven for rotation clockwise. Thus the swtiching lever 33 is caused by the pivotal movement of the cam arm 57 to move clockwise through the spring 58 as shown in FIG. 14, to press the switching pulley 33 and the C-shaped ring 32 downwardly as a unit toward the belt pulley 19. This causes rotation of the belt pulley 19 to be transmitted through the switching pulley 31 to the drive pulley 10, to thereby rotate the idler 12 counterclockwise, so that the idler arm 11 is oscillated clockwise to drive the reel deck 3 to rotate clockwise. This allows quick tape feed in the forward direction to be effected.

Meanwhile in the REW mode, the motor 4 rotates in the reverse direction, but the rotation of the belt pulley 19 is transmitted through the switching pulley 31 and the drive pulley 10 to the idler 12 which drives the reel deck 2 for rotation in the counterclockwise direction to effect quick tape feed in the reverse direction. As the cam gear 71 rotates until this condition is reached, the lever 72 also continues its counterclockwise pivotal movement to bring the mode switch 74 through the mode slider 73 to a contact set for the FF/REW mode, to thereby cut off power supply to the mode switching motor 37. The rotation of the cam gear 71 until the FF/REW mode is reched causes the levers 77 and 78 linked to the slot 76c of the switching lever 76, the pinch roller arm 82 and the tape loading mechanism shown in FIG. 6 to be slightly displaced from their positions shown in FIG. 1. However, this does not interfere with high-speed tape feed.

As the reel drive system in the FF/REW mode is switched to a stop mode, power supply to the motor 4 is interrupted and the mode switching motor 37 is driven to rotate in a direction opposite the aforesaid direction. This causes the cam gear 71 to rotate counterclockwise in FIG. 2 through the worm 70. At this time, the bent portion 89a of the lock arm 89 has moved through the one-way clutch to a position in which it is positioned against the latch pulley 95, so that the pawl of the latch pulley 95 is positioned against the portion 89a simultaneously as the mode swithcing motor 37 rotates in the reverse direction, to thereby cause the lock arm 89 to pivotally move in the counterclockwise direction against the biasing force of the spring 88. This releases the lock arm 89 from locking engagement with the pin 87b and moved downwardly together with the brake slider 90 as a unit by the biasing force of the spring 88, to be thereby restored to the position shown in FIG. 2. This releases the return arm 91 from pressing engagement by the pin 91b and allows same to pivotally move counterclockwise in FIG. 1, so that the brake arms 54 and 55 are pivotally moved by the biasing force of the spring 56 to apply the brake to the reel decks 2 and 3. Thus the high-speed tape feed in the FF/REW mode is released and the tape is brought to a halt momentarily. Rotation of the mode switching lever 76 back to its original position moves the pin 76d from its position shown in FIG. 13 to its position shown in FIG. 11, so that the cam arm 57 is released from pressing at the cam section 57c and returned by the biasing force of the spring 58 to the position shown in FIG. 12 in which the switching lever 33 is positioned by the stopper 139. Meanwhile the pin 76e pivotally moves the arm 86 clockwise in FIG. 2, to thereby cause the slider 87 to move downwardly. Soon the pin 87b locks the lock arm 89 by the biasing force of the spring 88. At this time, rotation of the cam gear 71 pivotally moves the lever 72 back to its original position, and the mode switch 74 is also restored to a contact set for the stop mode, so that the mode switching motor 37 stops rotating.

Operation of the reel drive system performed when a recording (reproducing) mode operation button, not shown, is depressed will be described. The mode switch 74 has its contact located in the recording (reproducing) mode further advanced than in the FF/REW mode to obtain an incrased amount of rotation of the mode switching motor 37. More specifically, when the recording (reproducing) mode operating button is depressed, the brake applied to the reel decks 2 and 3 is first released as is the case with the FF/REW mode described hereinabove. However, at this time, the motor 4 is not yet driven for rotation. Further rotation of the mode switching motor 37 causes the gear 9 rotating in meshing engagement with the gear 7 to make the pins 71c and 71b shown in FIG. 1 to press the spring pressor arms 110 and 101, to further actuate the drive arms 106 and 97 to pivotally move counterclockwise and clockwise respectively. Thus the guide member 117 is driven through the arms 108 and 114 to cause the tape guides 115 and 116 to withdraw a tape from the tape cassette 40. Likewise, the guide member 104 is driven through the arm 98 to cause the tape guides 102 and 103 to withdraw the tape from the tape cassette 40.

Figure 15:
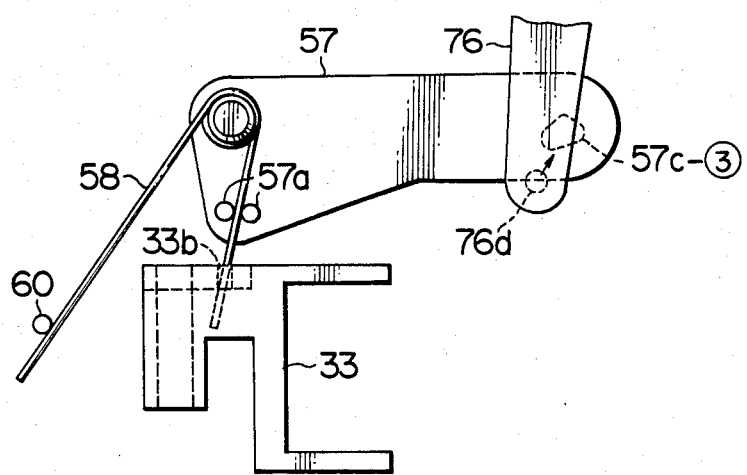
FIG. 15 is a plan view showing the operation of the essential portions of the reel drive section shown in FIG. 11 from the reproducing (recording) mode to shutdown of the reel drive system.

Further rotation of the mode switching motor 37 causes the guide members 117 and 104 to continuously move along the guide groove 118 in the chassis 1 until they abut against the stoppers 46 and 45 and positioned as predetermined. Thus the tape guides 41, 42, 43 and 44 define a predetermined path of travel of the tape. At this time, the pressor springs 112 and 112' are deflexed a predetermined about to produce a force high enough to press the guide members 117 and 104 against the stoppers 46 and 45 to hold the former in position. Meanwhile the pin 76d of the mode switching lever 76 effects, as shown in FIGS. 13 and 14, switching of the path of transmittance of the rotation of the switching pulley 31 in the vicinity of the FF/REW mode. However, further rotation of the mode switching lever 71 brings the pin 76d out of contact with the cam section 57c-② of of the cam arm 57 to allow the latter to be restored to the original position by the biasing force of the spring 58 as shown in FIG. 15. This brings the path of transmittance of the rotation of the switching pulley 31 to the condition shown in FIG. 12.

Thereafter, the rotation transmitted to the belt pulley 19 is transmitted by the belt 20 to the takeup pulley because switching has already been effected to drive the motor 4 for rotation, so that a predetermind amount of rotation is transmitted through a slip mechanism comprising the felt washers 25 and 26, pressor plate 27, spring 28 and stopper 29 to the switching pulley 31 from the takeup gear 24 through the idler gear 30. Thus the drive pulley 10 is driven for rotation. At this time, the idler 12 is brought into contact with either the reel deck 2 or 3 for rotation depending on the direction of rotation of the motor 4, as is the case with the FF/REW mode. Rotation of the motor 4 also drives the flywheel 7 through the belt 8. However, to nicely time the driving of the reel deck by the idler 12 with initiation of tape drive by the capstan 6 and pinch roller 49 as presently to be described, an inhibiting mechanism, not shown, is brought into motion when the reel deck is driven by the idler 12 to thereby regulate the operation of the idler arm 11.

Meanwhile the lever 77 fitted in the slot 76c of the mode switching lever 76 and hence the lever 78 linked thereto press the pin 79 rightwardly in FIG. 1 to thereby gradually move the pinch roller arm 82 counterclockwise. By the time the guide members 117 and 118 reach the stoppers 46 and 45, the pinch roller 49 is in engagement with the capstan 6 with the tape drawn out of the cassette 40 being interposed therebetween. As the pin 79 is pressed as aforesaid, the arm 6 begins to move pivotally in the clockwise direction against the biasing force of the spring 84. As a result, the pinch roller 83 presses the tape against the capstan 6 by the biasing force of the spring 84 and begins to drive the tape at a predetermined speed. The aforesaid inhibiting mechanism for the idler arm 11 is released from operation to allow the reel deck 2 or 3 to be driven for rotation. When the motor 4 rotates clockwise in FIG. 1, the capstan 6 and reel deck 3 are both rotated clockwise to cause the tape to travel forwardly; when the motor 4 rotates counterclockwise, the capstan 6 and reel deck 2 are both rotated clockwise to cause the tape to travel in the reverse direction.

As the cam gear 71 rotates until the pinch roller 49 presses against the capstan 6, the lever 72 continues its counterclockwise pivotal movement in FIG. 2 to move the mode switch through the mode slider 73 to a contact set for the recording (reproducing) mode, to thereby cut off power supply to the mode switching motor 37. Rotation of the mode switching motor 37 is transmitted through a speed reducing mechanism constituted by the worm 70 and the cam gear 71, so that the pinch roller 49 and the guide members 117 and 104 are positively held in pressing engagement with the capstan 6 and the stoppers 46 and 45 respectively, even after the mode switching motor 37 is rendered inoperative.

Operation of switching the recoding (reproducing) mode to the stop mode will be described. Upon a stop button, not shown, being depressed, the mode switching motor 37 beings to rotate in a direction opposite the direction in which it rotates when tape loading is effected and the motor 4 begins to rotate in the same direction as it rotates when the tape is moved in the reverse direction. This causes the cam gear 71 to rotate counterclockwise in FIG. 2, so that the mode switching lever 76 pivotally moves clockwise to release the pinch roller 49 from pressing engagement with the capstan 6. In FIG. 1, the cam gear 71 and the gear 96 rotate clockwise and counterclockwise respectively to thereby release the guide members 117 and 104 from pressing engagement with the stoppers 46 and 47 and dllows same to move rearwardly. At the same time, the reel deck 2 is driven by the motor 4 counterclockwise along the transmission path through the slip mechanism shown in FIG. 12, to wind the tape in the tape cassette 40 by avoiding loosening thereof as the tape guides 41, 42, 43 and 44 move rearwardly. Upon completion of the tape unloading operation, the pin 76d moves in the direction of an arrow from the position shown in FIG. 15 into abutting engagement with the cam section 57c-③ of the cam arm 57 which is slightly moved counterclockwise in FIG. 15. However, this displacement of the cam arm 57 causes the ribs 57a only slightly deflex one arm of the spring 58, when the pin 76d is released from engagement with the cam section 57c-③, the cam arm 57 is restored to its position shown in FIG. 11 by the biasing force of the spring 58. During the aforesaid operation, the position of the switching arm 33 shown in FIG. 21 shows no change. Thus the path of transmittance is all through the slip mechanism for effecting elimination of loosening of the tape.

As the mode switching lever 76 reaches near the FF/REW mode, release of the latch pully 95 from locking engagement with the lock arm 89 actuates, in the same manner as in switching the FF/REW mode to the stop mode, the brake arms 54 and 55 to apply the brake to the reel decks 2 and 3. Restoration of the pinch roller arm 82 and the guide members 117 and 104 to the positions shown in FIG. 1 brings the mode switch 74 to the contact for the stop mode, to thereby cut off power supply to the motors 4 and 37 to render same inoperative. Although description will be omitted, it is possible to effect reproducing at high spped in the forward and reverse directions by means of this reel drive system.

From the foregoing description, it will be appreciated that the reel drive system according to the invention enables reel takeup for the forward and reverse reproducing opeations and high-speed takeup for the FF and REW operations to be effected by using only one motor as a power source for the tape drive system. Also switching of the rotation transmission paths can be effected by using a single power source, such as a solenoid, or by using a loading motor concurrently for the purpose of path switching. This eliminates the need to render variable the voltage applied to the motor and the construction is simple. The slip mechanism for the reproducing operation can be used for both forward and reverse directions, and the oscillating idler mechanism can be used for all the modes. This is conductive to a reduction in the number of parts and enables remote control to be readily effected.

Particularly, the invention enables tape drive for each of the operation modes to be effected by means of two motors or a tape drive motor and a mode switching motor. This renders the apparatus low in cost and amenable to remote control. When no solenoid is used, power consumption can be reduced, so that the reel drive system according to the invention has particular utility for use with a portable type magnetic recording and reproducing apparatus.

What is claimed is:

1. A magnetic recording reproducing apparatus wherein a magnetic head is brought into contact with a magnetic tape wound on a pair of reels for effecting magnetic recording and reproducing of information, the apparatus comprising:

(a) a first motor capable of rotation in the normal and the reverse direction;

(b) a drive pulley rotatable about a support shaft located in a predetermined position between said pair of reels;

(c) oscillating idler means connected to said drive pulley an automatically oscillatable around said support shaft dependent upon the direction of rotation of said drive pulley to drivingly engage with one of said pair of reels for rotating the reel;

(d) a first transmitting path for directly transmitting the rotation of said first motor to said drive pulley;

(e) a second transmitting path for transmitting the rotation of said first motor to said drive pulley through a slip mechanism for obtaining a desired output torque; and (f) a transmitting path switching mechanism for selecting one of said first and second transmitting paths depending on the operation mode.

2. A magnetic recording and reproducing apparatus as claimed in claim 1, further comprising:

(g) means for transmitting the rotation of said first motor to a capstan.

3. A magnetic recording and reproducing apparatus as claimed in claim 2, wherein said first motor has a motor pulley attached thereto; said transmitting path switching mechanism comprises a switching pulley supported on said support shaft for rotation and vertical movement; and said first transmitting path comprises a belt pulley supported on said support shaft for rotation and adapted to be driven from said motor pulley by a belt, and said switching pulley located in a position in which it is connected to said belt pulley.

4. A magnetic recording and reproducing apparatus as claimed in claim 3, wherein said second transmitting path is constructed to transmit power from said motor pulley to said switching pulley through said slip mechanism.

5. A magnetic recording and reproducing apparatus as claimed in any one of claims 1–4, further comprising:

(h) a second motor capable of rotation in the normal and reverse directions for a predetermined amount as the apparatus is switched from one operation mode to another; and (i) mode switching means actuated by the rotation of said second motor; wherein said mode switching means is linked to said transmitting path selecting mechanism to selectively obtain a drive force necessary for each operation mode.

6. A magnetic recording and reproducing apparatus as claimed in claim 5, further comprising:

(j) means for transmitting the rotation of said second motor to a loading/unloading mechanism for threading a magnetic tape through a predetermined path of its travel and recovering same therefrom.

7. A magnetic recording and reproducing apparatus as claimed in claim 6, wherein said mode switching means comprises a cam member driven by the rotation of said second motor, and a mode switching lever linked to said cam member to actuate same.

8. In a magnetic recording and reproducing apparatus comprising magnetic heads brought into contact with a magnetic tape wound on a pair of reels to effect magnetic recording and reproducing of information, a reel drive system comprising:

(a) a first motor capable of rotation in the normal and reverse directions;

(b) a drive pulley rotatably supported on a support shaft located on a bisector substantially perpendicular to said pair of reels;

(c) oscillating idler means comprising an idler arm having one end thereof pivotally mounted on said support shaft, and an idler connected for rotation to said drive pulley and rotatably supported by the other end of said idler arm, said oscillating idler means being automatically oscillatable around said support shaft dependent upon the direction of said drive pulley to drivingly engage with one of said pair of reels for rotating the reel; and (d) transmitting path selecting means for selecting, in accordance with each operation mode, one of a first transmitting path for directly transmitting the rotation of said first motor to said drive pulley and a second transmitting path for tramsmitting the rotation of said first motor to said drive pulley through a slip mechanism for obtaining a desired output torque.

9. A reel drive system as claimed in claim 8, wherein said transmitting path selecting means comprises a switching pulley supported on said support shaft for rotation and vertical movement and operative to form said first transmitting path or said second transmitting path depending on the position of said switching pulley on said support shaft.

10. A reel drive system as claimed in claim 9, wherein said first transmitting path is constituted by a belt pulley driven from said first motor by a belt and supported for rotation on said support shaft, and said switching pulley located in a position suitable for connection to said belt pulley.

11. A reel drive system as claimed in claim 10, wherein said second transmitting path is formed in such a manner that the rotation of said belt pulley is transmitted through said slip mechanism to said switching pulley.

12. A reel drive system as claimed in claim 11, wherein said second transmitting path is constituted by said belt pulley, a takeup pulley driven from said belt pulley by a belt, said slip mechanism attached to said takeup pulley, and said switching pulley having the rotation of said slip mechanism transmitted thereto.

13. A reel drive system as claimed in any one of claims 9, 10, 11 and 12, wherein said transmitting path selecting means further comprises a switching arm operative to vertically move said switching pulley in accordance with the operation mode.

14. A reel drive system as claimed in claim 13, further comprising:

(e) a second motor capable of rotation in the normal and the reverse directions, said second motor rotating a predetermined amount for each operation mode as opeation mode switching is effected; and (f) mode switching means actuated by the rotation of said second motor; wherein said mode switching means is operative to actuate said switching arm as each different operation mode is selected.

15. A magnetic recording and reproducing apparatus wherein a magnetic head is brought into contact with a magnetic tape wound on a pair of reels for effecting magnetic recording and reproducing of information, the apparatus comprising:

a first motor capable of rotation in the normal and the reverse direction;

a drive pulley rotatable about a support shaft located in a predetermined position between said pair of reels;

oscillating idler means connected to said drive pulley and automatically oscillatable around said support shaft dependent upon the direction of said drive pulley to drivingly engage with one of said pair of reels for rotating the reel; and transmitting path selecting means for selecting one of a first transmitting path for magnetic tape fast feed operatives direction transmit the rotation of said first motor to said drive pulley and second transmitting path for magnetic tape constant speed feed operative to transmit the rotation of said first motor through a slip mechanism for obtaining a predetermined output torque.

16. A magnetic recording and reproducing apparatus as claimed in claim 15, wherein said transmitting path selecting means is operative to select said second transmitting path in a recording or reproducing mode of constant speed.

17. A magnetic recording and reproducing apparatus as claimed in claim 15 or 16, wherein said transmitting path selecting means is operative to select said first transmitting path in a fast forward or rewind mode.

18. A magnetic recoding and reproducing apparatus as claimed in claim 17, wherein a loading/unloading mechanism operative to placing said magnetic tape in a predetermined loading position and recovering same from said loading position to a stop position is located between said loading position and said stop position.

19. A magnetic recoding and reproducing apparatus as claimed in claim 15 or 16, wherein said transmitting path selecting means is operative to select said second transmitting path when a constant speed reproducing mode or a recording mode is switched to a stop mode.

20. A magnetic recording and reproducing apparatus wherein a magnetic head is brought into contact with a magnetic tape wound on a pair of reels for effecting magnetic recording and reproducing information the apparatus comprising:

(a) a first motor capable of rotation in the normal and the reverse direction;

(b) a drive pulley rotatable about a support shaft located in a predetermined position between said pair of reels;

(c) oscillating idler means connected to said drive pulley for rotation, said oscillating idler means being operative to drive one of said pair of reels for rotation depending on the direction of rotation of said drive pulley;

(d) a first transmitting path for directly ransmitting the rotation of said first motor to said drive pulley;

(e) a second transmitting path for transmitting the rotation of said first motor to said drive pulley through a slip mechanism for obtaining a desired output torque; and (f) a transmitting path switching mechanism for selecting one of said first and second transmitting paths depending on the operation mode and (g) wherein said first motor has a motor pulley attached thereto; said transmitting path switching mechanism comprises a switching pulley supported on said support shaft for rotation and vertical movement; and said first transmitting path comprises a belt pulley supported on said support shaft for rotation and adapted to be driven from said motor pulley by a belt, and said switching pulley located in a position in which it is connected to said belt pulley.

21. A magnetic recording and reproducing apparatus as claimed in claim 20, wherein said second transmitting path is constructed to transmit power from said motor pulley to said switching pulley through said slip mechanism.

22. A magnetic recording and reproducing apparatus as claimed in one of claims 20 or 21, further comprising:
(h) a second motor capable of rotation in the normal and reverse directions for a predetermined amount as the apparatus is switched from one operation mode to another; and
(i) mode switching means actuated by the rotation of said second motor; and
wherein said mode switching means is linked to said transmitting path selecting mechanism to selectively obtain a drive force necessary for each operation mode.

23. A magnetic recording and reproducing apparatus as claimed in claim 22, further comprising:
(j) means for transmitting the rotation of said second motor to a loading/unloading mechanism for threading a magnetic tape through a predetermined path of its travel and recovering the same therefrom.

24. A magnetic recording and reproducing apparatus as claimed in claim 23, wherein said mode switching means comprises a cam member driven by the rotation of said second motor, and a mode switching lever linked to said cam member to actuate the same.

* * * * *